(12) United States Patent
Brown et al.

(10) Patent No.: US 7,908,845 B2
(45) Date of Patent: Mar. 22, 2011

(54) MIXING APPARATUS FOR AN EXHAUST AFTER-TREATMENT SYSTEM

(75) Inventors: David B. Brown, Brighton, MI (US);
Rahul Mital, Rochester Hills, MI (US);
Kasser A. Jaffri, Rochester, MI (US);
Kevin B. Fuqua, Clarkson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 835 days.

(21) Appl. No.: 11/735,780

(22) Filed: Apr. 16, 2007

(65) Prior Publication Data

US 2008/0250776 A1     Oct. 16, 2008

(51) Int. Cl.
*F01N 3/00* (2006.01)
(52) U.S. Cl. ............... 60/286; 60/272; 60/274; 60/295; 60/299; 60/303; 60/324
(58) Field of Classification Search ............ 60/272, 60/274, 286, 295, 296, 299, 303, 324
See application file for complete search history.

(56) References Cited

U.S. PATENT DOCUMENTS

| 6,449,947 | B1 * | 9/2002 | Liu et al. | 60/286 |
| 7,328,572 | B2 * | 2/2008 | McKinley et al. | 60/286 |
| 7,533,520 | B2 * | 5/2009 | Cheng et al. | 60/286 |
| 7,581,387 | B2 * | 9/2009 | Bui et al. | 60/286 |

FOREIGN PATENT DOCUMENTS

| DE | 102007012790 A1 * | 9/2008 | 60/303 |
| EP | 1712751 A2 * | 10/2006 | 60/303 |

* cited by examiner

*Primary Examiner* — Binh Q. Tran
(74) *Attorney, Agent, or Firm* — Quinn Law Group, PLLC

(57) ABSTRACT

A mixing apparatus mountable within a generally cylindrical passage defined by an exhaust gas conduit of an exhaust gas after-treatment system is provided. The passage includes an outer region and an inner region operable to convey an exhaust stream and a liquid stream, such as a urea stream. The mixing apparatus includes a retainer ring operable to retain the mixing apparatus within the passage. A first plurality of fins extends from the retainer ring and is operable to impart a rotational velocity component in a first direction to the exhaust stream and urea stream in the outer region of the passage. A second plurality of fins extends from the retainer ring and is operable to impart a rotational velocity component in a second direction, opposite the first direction, to the exhaust stream and urea stream in the inner region of the passage.

18 Claims, 3 Drawing Sheets

US 7,908,845 B2

MIXING APPARATUS FOR AN EXHAUST AFTER-TREATMENT SYSTEM

TECHNICAL FIELD

The present invention relates to a mixing apparatus operable to enhance the mixing of a liquid, such as urea, within an exhaust stream of an exhaust after-treatment system.

BACKGROUND OF THE INVENTION

Selective Catalytic Reduction (SCR) of oxides of nitrogen ($NO_x$) by nitrogen compounds, such as ammonia or urea, has proven to be effective in industrial stationary engine applications. More recently, ammonia-SCR has been incorporated into mobile diesel internal combustion engines such as heavy-duty truck and bus engines.

Generally, in the ammonia-SCR process, an aqueous water solution of urea is injected into the exhaust gas stream of an engine. At temperatures above 160° C., the urea begins to undergo hydrolysis and thermal decomposition resulting in the production of ammonia. The resulting mixture including urea/ammonia and exhaust gases then passes to an SCR catalyst such as platinum (Pt), vanadium ($V_2O_5$), or zeolite, where the ammonia reacts with $NO_x$ gases to form nitrogen gas and water.

SUMMARY OF THE INVENTION

A mixing apparatus mountable within a generally cylindrical passage defined by an exhaust gas conduit of an exhaust gas after-treatment system is provided. The passage includes an outer region and an inner region operable to convey an exhaust stream and a liquid stream, such as a urea stream. The mixing apparatus includes a retainer ring operable to retain the mixing apparatus within the passage. A first plurality of fins extends from the retainer ring and is operable to impart a rotational velocity component in a first direction to the exhaust stream and urea stream in the outer region of the passage. A second plurality of fins extends from the retainer ring and is operable to impart a rotational velocity component in a second direction, opposite the first direction, to the exhaust stream and urea stream in the inner region of the passage. An exhaust after-treatment system incorporating the mixing apparatus is also disclosed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
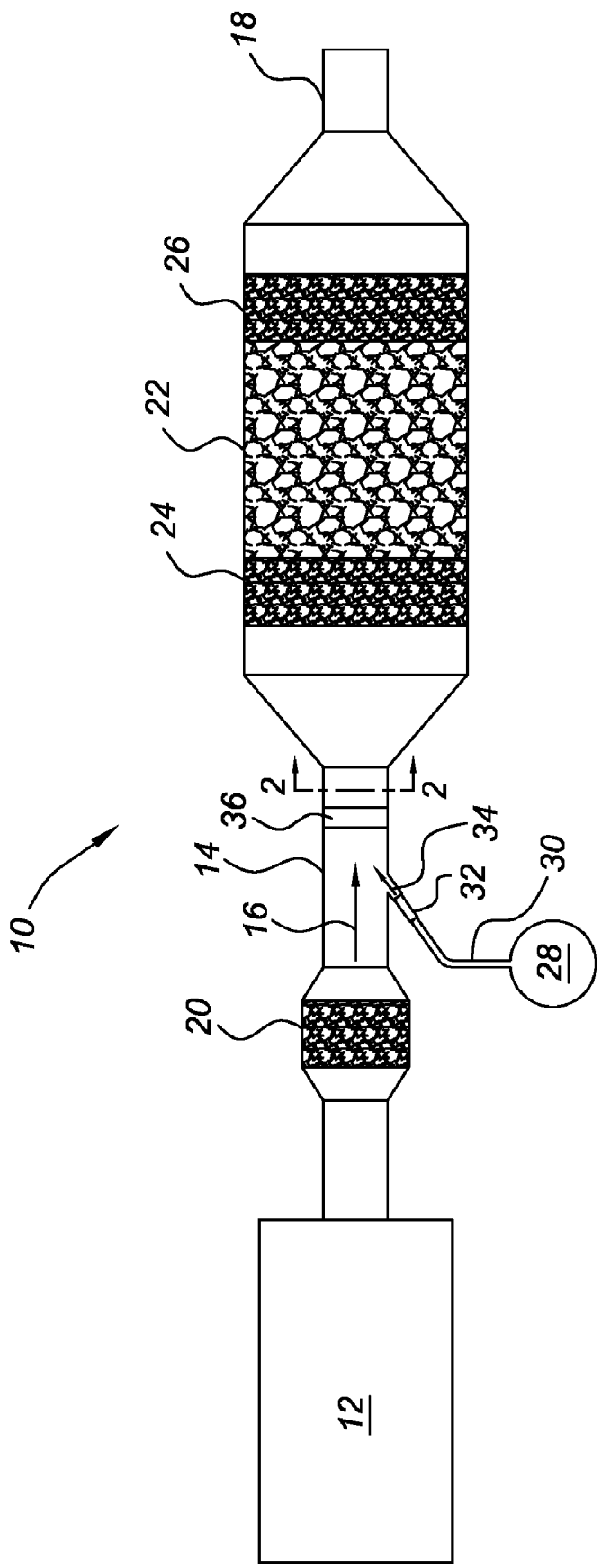
FIG. 1 is a schematic depiction of an exhaust after-treatment system for an internal combustion engine incorporating a mixing apparatus.

Referring now to the drawings wherein like reference numbers correspond to like or similar components throughout the several figures, numeral 10 generally indicates an ammonia-Selective Catalyst Reduction (SCR) exhaust after-treatment system for treatment of exhaust gases produced by an engine 12, such as a vehicular compression-ignited internal combustion engine. The exhaust after-treatment system 10 increases oxides of nitrogen ($NO_x$) conversion and therefore, advantageously, results in decreased $NO_x$ emissions from the engine 12. Due to the increased efficiency of the exhaust after-treatment system 10, a reduction in the catalyst volume may be permitted, thereby reducing the cost of the exhaust after-treatment system 10.

The exhaust after-treatment system 10 includes an exhaust conduit 14 for conducting an exhaust stream, indicated by arrow 16, emitted from the engine 12. The exhaust stream 16 includes exhaust gases produced by combustion reactions within the engine 12 that flow through the conduit 14 of the exhaust after-treatment system 10 and are discharged to the atmosphere at a discharge end 18. Hence, the direction of flow of the exhaust stream 16 is from the engine 12 to the discharge end 18.

In the direction of flow, the exhaust stream 16 first passes through a pre-oxidation catalyst 20. The pre-oxidation catalyst 20 treats unburned hydrocarbons and converts NO to $NO_2$, which reacts more readily with $NH_3$ to form $N_2$. Further downstream from the pre-oxidation catalyst 20 is an SCR catalyst 22. The SCR catalyst 22 may be formed from, for example, a platinum (Pt), vanadium ($V_2O_5$), or zeolite material. The SCR catalyst 22 promotes the reaction of ammonia ($NH_3$) with $NO_x$ to form nitrogen and water, thereby reducing $NO_x$ emissions. A hydrolysis catalyst 24 is located directly upstream from the SCR catalyst 22. The hydrolysis catalyst 24 promotes the reaction of urea with water to form ammonia and carbon dioxide ($CO_2$), thereby helping to assure the availability of ammonia in the exhaust stream 16 prior to entering the SCR catalyst 22. An oxidation catalyst 26 is located directly downstream of the SCR catalyst 22. The oxidation catalyst 26 promotes the breakdown of excess ammonia that did not react in the SCR catalyst 22. The oxidation catalyst 26 is a "guard catalyst" that is effective in limiting ammonia slip. In other words, the oxidation catalyst 26 promotes oxidation of excess ammonia, thereby limiting the release of ammonia from the exhaust after-treatment system 10.

The exhaust after-treatment system 10 further includes a urea source 28 for storing a supply of aqueous urea solution. Typically, the aqueous urea solution is 32.5% urea to water. At this concentration, the aqueous urea solution has its lowest freezing point of approximately 11° F. and therefore is least likely to freeze during cold external temperature conditions (e.g., winter operation). A fluid line 30 provides communication of the aqueous urea solution from the urea source 28 to an injector nozzle 32. The injector nozzle 32 is provided in communication with the exhaust conduit 14. The injector nozzle 32 is located upstream from the SCR catalyst 22 and hydrolysis catalyst 24 and is downstream from the pre-oxidation catalyst 20. The injector nozzle 32 is operable to introduce an amount of urea in the form of a liquid stream or urea stream, indicated by arrow 34, into the exhaust conduit 14 for subsequent mixing with the exhaust stream 16. To increase the effectiveness of the SCR catalyst 22, the urea stream 34 should be well mixed with the exhaust stream 16.

A mixing apparatus 36 is provided within the exhaust conduit 14 and downstream from the injector nozzle 32. The mixing apparatus 36 is operable to impart rotational motion to the exhaust stream 16 and urea stream 34 thereby increasing the mixing of thereof. The mixing apparatus 36 may be placed upstream from the injector nozzle 32 while remaining within the scope of that which is claimed. The mixing apparatus 36 will be described in greater detail hereinbelow with reference to FIGS. 3 through 5.

Figure 2:
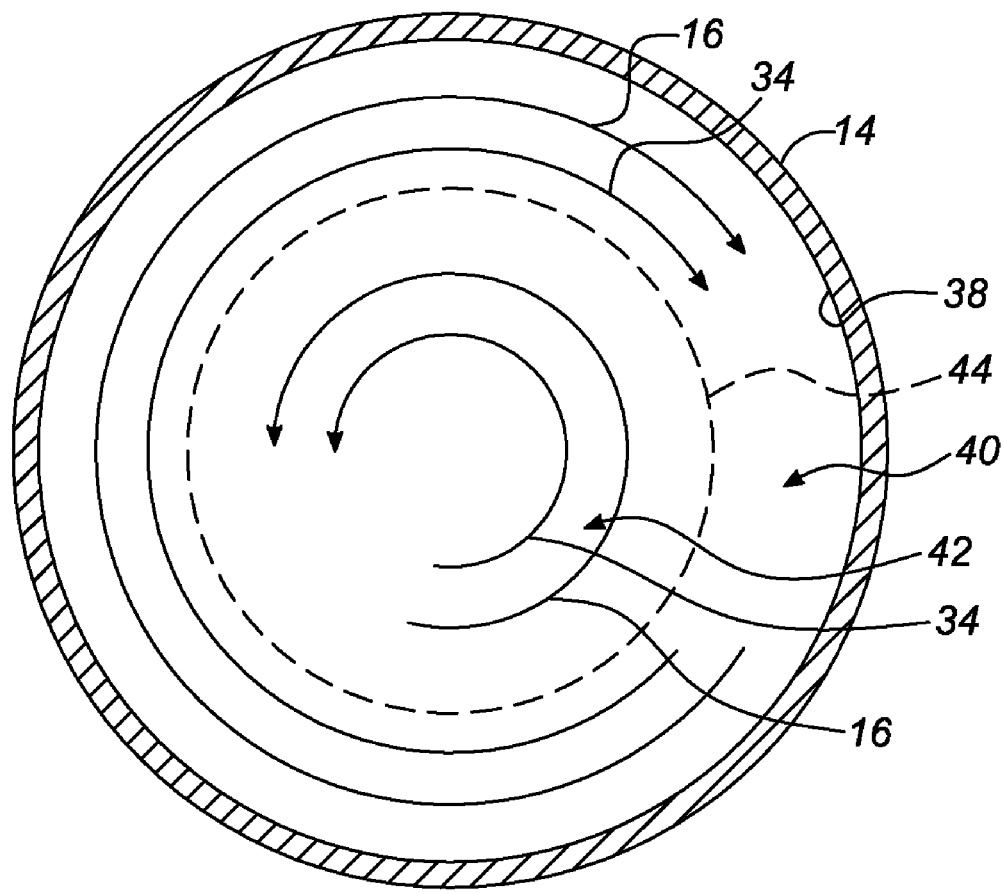
FIG. 2 is a sectional view of an exhaust conduit downstream from the mixing apparatus, taken along Line 2-2 of FIG. 1, and illustrating the rotational motion of an exhaust stream and a urea stream.

Referring now to FIG. 2 there is shown a cross sectional view of the exhaust conduit 14, taken along Line 2-2 of FIG. 1, illustrating the rotational motions imparted on the exhaust stream 16 and the urea stream 34. A generally cylindrical passage 38, defined by the flow conduit 14, can be separated into an outer region 40 and an inner region 42. The outer region 40 and the inner region 42 are delineated in FIG. 2 by an imaginary broken line, indicated at 44. The mixing apparatus 36, shown in FIG. 1, is operable to impart a clockwise rotational velocity component, as viewed in FIG. 2, to the exhaust stream 16 and the urea stream 34 in the outer region 40 of the passage 38. Additionally, the mixing apparatus 36 is operable to impart a counter clockwise rotational velocity component, as viewed in FIG. 2, to the exhaust stream 16 and the urea stream 34 in the inner region 42 of the passage 38. The clockwise velocity component within the outer region 40 and the counterclockwise velocity component within the inner region 42 cooperate to enhance the mixing of the urea stream 34 with the exhaust stream 16. Additionally, the mixing apparatus 36 preferably causes an amount of turbulent flow within the inner and outer regions 40 and 42 to aid in the mixing of the urea stream 34 within the exhaust stream 16.

Figure 3:
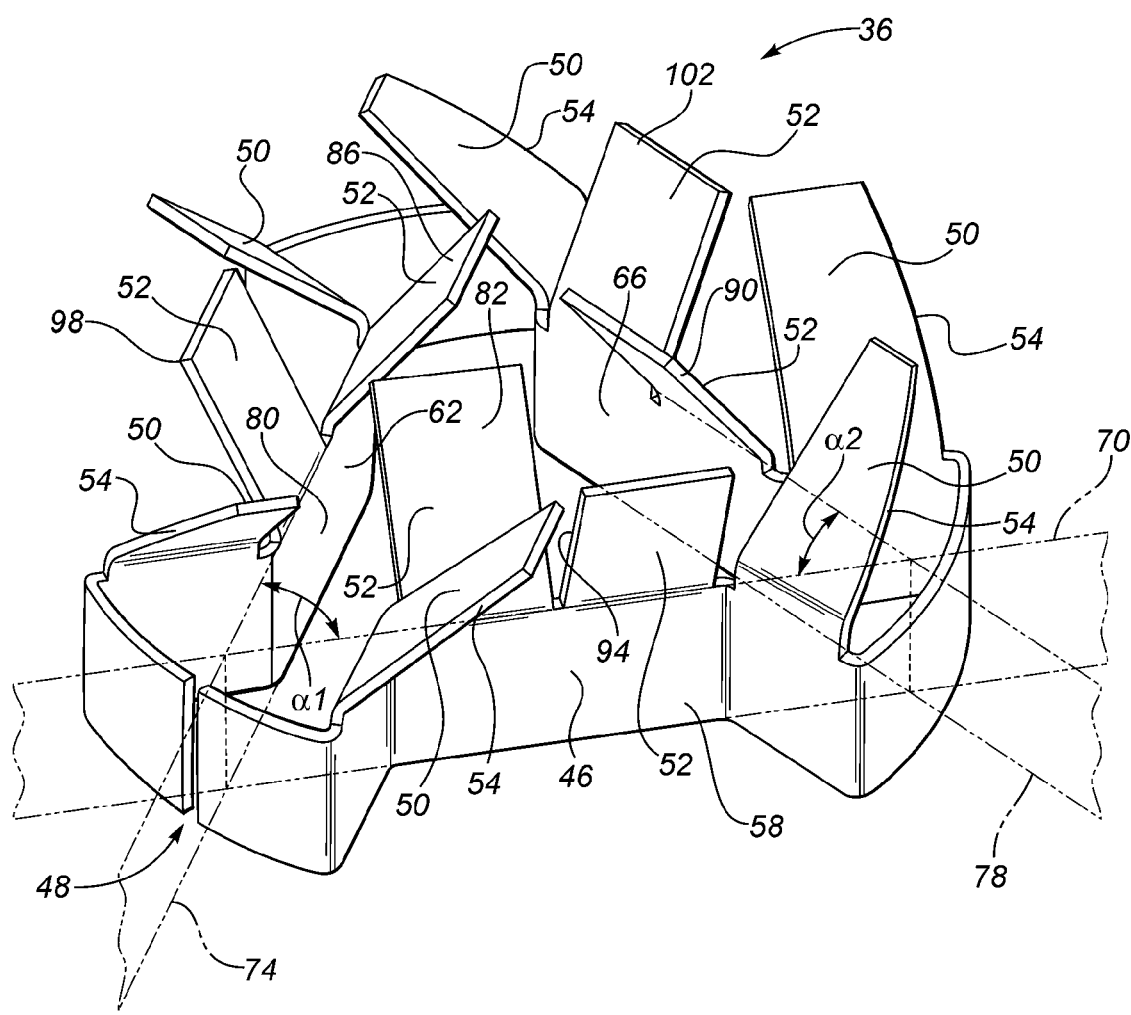
FIG. 3 is a perspective view of the mixing apparatus schematically shown in FIG. 1 and illustrating aspects of the preferred embodiment.

Referring now to FIG. 3 and with continued reference to FIGS. 1 and 2, there is shown a perspective view of the mixing apparatus 36 in accordance with the preferred embodiment. The mixing apparatus 36 includes a retainer ring 46 formed from sheet metal. The metal, such as stainless steel, titanium, or steel, is preferably chosen to withstand the heat and corrosive environment within the passage 38. The retainer ring 46 is operable to retain the mixing apparatus 36 within the passage 38 of the exhaust conduit 14. The retainer ring 46 defines a slit 48 operable to allow the outer circumference of the retainer ring to be reduced for insertion into the passage 38 of the exhaust conduit 14. Once installed, the retainer ring 46 biases radially outward into engagement with the exhaust conduit 14 thereby locking or retaining the mixing apparatus 36 within the passage 38.

The retainer ring further includes a first and second plurality of fins 50 and 52, respectively. The first plurality of fins 50 are positioned generally at the perimeter of the retainer ring 46 such that when the mixing apparatus 36 is disposed within the passage 38, the first plurality of fins 50 are positioned generally within the outer region 40 of the passage 38. The second plurality of fins 52 are positioned generally centrally on the retainer ring 46 such that when the mixing apparatus 36 is disposed within the passage 38, the second plurality of fins 52 are positioned generally within the inner region 42 of the passage 38. An outer edge 54 of the each of the first plurality of fins 50 is profiled to generally approximate the curvature of the exhaust conduit 14. The first and second plurality of fins 50 and 52 are preferably formed integrally with the retainer ring 46. Advantageously, by forming the first and second plurality of fins 50 and 52 integrally with the retainer ring 46, a blank may be stamped from sheet metal and bent to the desired shape thereby reducing the complexity of manufacturing the mixing apparatus 36.

The mixing apparatus 36, when mounted within the passage 38, is oriented such that the retainer ring 46 is upstream from the first and second plurality of fins 50 and 52. Each of the first plurality of fins 50 are bent with respect to the retainer ring 46 such that the first plurality of fins 50 is operable to impart a generally clockwise rotational velocity component to the exhaust and urea streams 16 and 34 within the outer region 40 of the passage 38, as shown in FIG. 2. Additionally, each of the second plurality of fins 52 are bent with respect to the retainer ring 46 such that the second plurality of fins 52 is operable to impart a generally counterclockwise rotational velocity component to the exhaust and urea streams 16 and 34 within the inner region 42 of the passage 38, as shown in FIG. 2. In a preferred embodiment, the first and second pluralities of fins 50 and 52 are operable to create turbulent flow within the respective first and second regions 40 and 42 of the passage 38. By creating a turbulent swirling motion within the outer region 40 of the passage 38 and a turbulent counter-swirling motion within the inner region 42 of the passage, the respective first and second plurality of fins 50 and 52 are operable to enhance or improve mixing between the exhaust stream 16 and the urea stream 34 thereby presenting a more uniform mixture to the SCR catalyst 22 and increasing the conversion efficiency thereof.

The retainer ring 46 includes a first portion 58, a second portion 62, and a third portion 66. The first portion 58 is coextensive with a first plane 70; the second portion 62 is coextensive with a second plane 74; and the third portion 66 is coextensive with a third plane 78. The first, second, and third planes 70, 74, 78 cooperate to define a triangle 80 having a first angle $\alpha 1$ formed at the intersection of the first plane 70 and the second plane 74, a second angle $\alpha 2$ formed at the intersection of the first plane 70 and the third plane 78, and a third angle (not shown in FIG. 3) formed by the intersection of the second and third planes 74, 78. The second plurality of fins 52 includes a first fin 82 that extends from the first portion 58 and toward the interior of the triangle 80, a second fin 86 that extends from the second portion 62 and toward the interior of the triangle 80, and a third fin 90 that extends from the third portion 66 and toward the interior of the triangle 80. A fourth fin 94 extends from the first portion 58 and away from the interior of the triangle 80, a fifth fin 98 extends from the second portion 62 and away from the interior of the triangle 80, and a sixth fin 102 extends from the third portion 66 and away from the interior of the triangle 80. Fins 82, 86, 90, 94, 98, 102 are untapered, i.e., are characterized by a constant width.

Figure 4:
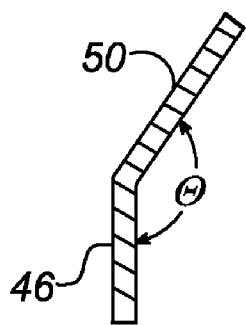
FIG. 4 is a cross sectional view of one of a first plurality of fins which form part of the mixing apparatus of FIG. 3.
Figure 5:
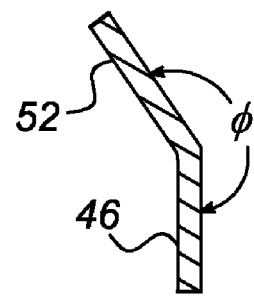
FIG. 5 is a cross sectional view of one of a second plurality of fins which form part of the mixing apparatus of FIG. 3.

Referring now to FIG. 4 there is shown a cross sectional view of the retaining ring 46 and one of the first plurality of fins 50. The first plurality of fins 50 are preferably oriented with respect to the retaining ring 46 by an included angle, indicated as $\Theta$. The included angle $\Theta$ is preferably between 120 and 160 degrees. Similarly, FIG. 5 illustrates a cross sectional view of the retaining ring 46 and one of the second plurality of fins 52. The second plurality of fins 52 are preferably oriented with respect to the retaining ring 46 by an included angle, indicated as $\Phi$. The included angle $\Phi$ is preferably between 190 and 235 degrees. In the preferred embodiment, the first plurality of fins 50 will number between 3 and 12, while the second plurality of fins 52 will number between 3 and 9.

Referring to FIGS. 1 through 5, The mixing apparatus 36 employs a relatively steep included angle $\Theta$ to promote swirl or rotation of the relatively slow moving exhaust gas stream 16 and urea stream within the outer region 40 of the passage 38. The use of a steep included angle $\Theta$ produces strong rotation of the exhaust stream 16 thereby facilitating entrainment and mixing of the urea stream 34 therein. A relatively less steep included angle Φ produces turbulence and a counter-swirl or counter-rotation of the relatively high velocity exhaust gas stream 16 within the inner region 42 of the passage 38. The combined vortices produced by the swirl and counter swirl promote mixing between the exhaust stream 16 and the urea stream 34 which enables vaporization and uniform distribution of urea and exhaust gases over the surface of the SCR catalyst 22. The mixing apparatus 36 minimizes the pressure drop of the exhaust gas stream 16 as it passes through the mixing apparatus 36. Therefore, the mixing apparatus 36 has a relatively small effect on performance of the engine 12. Additionally, the inclusion of the mixing apparatus 36 within the passage 38 of the exhaust conduit 14 reduces the length of the exhaust conduit 14 required to ensure adequate mixing of the exhaust stream 16 and the urea stream 34, thereby reducing the space required to package the exhaust after-treatment system 10. Furthermore, the mixing apparatus 36 is operable to provide mixing between the exhaust gas stream 16 and other liquid streams such as a hydrocarbon stream.

While the best modes for carrying out the invention have been described in detail, those familiar with the art to which this invention relates will recognize various alternative designs and embodiments for practicing the invention within the scope of the appended claims.

The invention claimed is:

1. A mixing apparatus mountable within a generally cylindrical passage defined by an exhaust gas conduit of an exhaust gas after-treatment system, the passage having an outer region and an inner region operable to convey an exhaust stream and a liquid stream, the mixing apparatus comprising:
   a retainer ring operable to retain the mixing apparatus within the passage, the retainer ring including a first portion that is coextensive with a first plane, a second portion that is coextensive with a second plane, and a third portion that is coextensive with a third plane;
   a first plurality of fins extending from said retainer ring and operable to impart a rotational velocity component in a first direction to at least one of the exhaust stream and liquid stream in the outer region of the passage; and
   a second plurality of fins extending from said retainer ring and operable to impart a rotational velocity component in a second direction, opposite said first direction, to at least one of the exhaust stream and liquid stream in the inner region of the passage;
   wherein the second plurality of fins includes a first fin extending from the first portion, a second fin extending from the second portion, and a third fin extending from the third portion; and
   wherein the first plane, second plane, and third plane define a triangle.

2. The mixing apparatus of claim 1, wherein the first, second, and third fins are untapered.

3. The mixing apparatus of claim 1, wherein said first direction is clockwise and said second direction is counterclockwise.

4. The mixing apparatus of claim 1, wherein said retainer ring and said first and second plurality of fins are integrally formed from sheet metal.

5. The mixing apparatus of claim 1, wherein each of said first plurality of fins is positioned with an included angle between 120 and 160 degrees with respect to said retainer ring.

6. The mixing apparatus of claim 1, wherein each of said second plurality of fins is positioned with an included angle between 190 and 235 degrees with respect to said retainer ring.

7. The mixing apparatus of claim 1, further comprising a fourth fin extending from the first portion, a fifth fin extending from the second portion, and a sixth fin extending from the third portion;
   wherein the first, second, and third fins extend toward the triangle; and
   wherein the fourth, fifth, and sixth fins extend away from the triangle.

8. An exhaust after-treatment system for an internal combustion engine comprising:
   an exhaust conduit defining a passage having an outer region and an inner region, said passage being generally cylindrical and operable to convey an exhaust stream from the internal combustion engine;
   an injector nozzle in communication with said said passage, said injector nozzle being operable to inject a liquid stream into said passage;
   a mixing apparatus mounted downstream from said injector nozzle within said passage and operable to promote mixing between said exhaust stream and said liquid stream;
   wherein said mixing apparatus includes:
      a retainer ring operable to retain the mixing apparatus within said passage, the retainer ring including a first portion that is coextensive with a first plane, a second portion that is coextensive with a second plane, and a third portion that is coextensive with a third plane;
      a first plurality of fins extending from said retainer ring and operable to impart a rotational velocity component in a first direction to said exhaust stream and said liquid stream in said outer region of said passage; and
      a second plurality of fins extending from said retainer ring and operable to impart a rotational velocity component in a second direction, opposite said first direction, to said exhaust stream and said liquid stream in said inner region of said passage;
   wherein the second plurality of fins includes a first fin extending from the first portion, a second fin extending from the second portion, and a third fin extending from the third portion; and
   wherein the first plane, second plane, and third plane define a triangle.

9. The exhaust after-treatment system of claim 8, further comprising
   a source of urea;
   wherein said liquid stream is a urea stream; and
   wherein said injector nozzle is in communication with said source of urea and said passage, said injector nozzle being operable to inject said urea stream into said passage.

10. The exhaust after-treatment system of claim 8, wherein said first direction is clockwise and said second direction is counterclockwise.

11. The exhaust after-treatment system of claim 8, wherein each of said first plurality of fins is positioned with an included angle between 120 and 160 degrees with respect to said retainer ring and wherein each of said second plurality of fins is positioned with an included angle between 190 and 235 degrees with respect to said retainer ring.

12. The exhaust after-treatment system of claim 8, further comprising a fourth fin extending from the first portion, a fifth fin extending from the second portion, and a sixth fin extending from the third portion;
   wherein the first, second, and third fins extend toward the triangle; and
   wherein the fourth, fifth, and sixth fins extend away from the triangle.

13. The exhaust after-treatment system of claim 8, further comprising a selective catalyst reduction catalyst and wherein said mixing apparatus is positioned upstream of said selective catalyst reduction catalyst.

14. The exhaust after-treatment system of claim 8, further comprising a pre-oxidation catalyst positioned upstream from said injector nozzle and said mixing apparatus.

15. The exhaust after-treatment system of claim 13, further comprising a hydrolysis catalyst positioned upstream from said selective catalyst reduction catalyst.

16. The exhaust after-treatment system of claim 8, wherein said retainer ring defines a slot that extends through the retainer ring and that facilitates the reduction of the outer circumference of the retainer ring to aid insertion of said mixing apparatus into said passage.

17. The exhaust after-treatment system of claim 8, wherein said mixing apparatus is formed from a single piece of sheet metal.

18. A mixing apparatus mountable within a generally cylindrical passage defined by an exhaust gas conduit of an exhaust gas after-treatment system, the passage having an outer region and an inner region operable to convey an exhaust stream and a urea stream, the mixing apparatus comprising:

a retainer ring operable to retain the mixing apparatus within the passage;

a slot defined by said retainer ring and operable to aid insertion of the mixing apparatus within the passage;

a first plurality of fins extending from said retainer ring and operable to impart a rotational velocity component in a first direction to the exhaust stream and urea stream in the outer region of the passage;

a second plurality of fins extending from said retainer ring and operable to impart a rotational velocity component in a second direction, opposite said first direction, to the exhaust stream and urea stream in the inner region of the passage;

wherein each of said first plurality of fins is positioned with an included angle between 120 and 160 degrees with respect to said retainer ring; and wherein each of said second plurality of fins is positioned with an included angle between 190 and 235 degrees with respect to said retainer ring;

wherein said retainer ring and said first and second plurality of fins are formed from a single piece of sheet metal.

* * * * *